US012631461B2

(12) United States Patent
Kibalama et al.

(10) Patent No.: US 12,631,461 B2
(45) Date of Patent: May 19, 2026

(54) SYSTEMS AND METHODS FOR ECO-APPROACH AND DEPARTURE AT A SIGNALIZED INTERSECTION USING VEHICLE DYNAMICS AND POWERTRAIN CONTROL WITH MULTIPLE HORIZON OPTIMIZATION

(71) Applicants: BorgWarner US Technologies LLC, Wilmington, DE (US); OHIO STATE INNOVATION FOUNDATION, Columbus, OH (US)

(72) Inventors: Dennis Kibalama, Columbus, OH (US); Shreshta Rajakumar Deshpande, Columbus, OH (US); Shobhit Gupta, Columbus, OH (US); Nicola Pivaro, Rovigo (IT); Marcello Canova, Columbus, OH (US); Karim Aggoune, Auburn Hills, MI (US); Peter M. Olin, Ann Arbor, MI (US)

(73) Assignee: BORGWARNER US TECHNOLOGIES LLC, Wilmington, DE (US)

( * ) Notice: Subject to any disclaimer, the term of this patent is extended or adjusted under 35 U.S.C. 154(b) by 226 days.

(21) Appl. No.: 17/534,621

(22) Filed: Nov. 24, 2021

(65) Prior Publication Data

US 2023/0160707 A1     May 25, 2023

(51) Int. Cl.
| | |
|---|---|
| *G01C 21/34* | (2006.01) |
| *B60L 58/30* | (2019.01) |
| *B60W 20/20* | (2016.01) |

(52) U.S. Cl.
CPC .......... *G01C 21/3469* (2013.01); *B60L 58/30* (2019.02); *B60W 20/20* (2013.01)

(58) Field of Classification Search
CPC ..... G01C 21/3469; B60L 58/30; B60W 20/20
See application file for complete search history.

(56) References Cited

U.S. PATENT DOCUMENTS

| | | | |
|---|---|---|---|
| 10,393,533 B2 | 8/2019 | Upadhyay et al. | |
| 2013/0304380 A1* | 11/2013 | MacNeille ......... | G01C 21/3469 701/533 |
| 2019/0143981 A1 | 5/2019 | Naserian et al. | |
| 2020/0058090 A1* | 2/2020 | Zanarini ................ | G06Q 50/26 |
| 2020/0216067 A1* | 7/2020 | Olin ..................... | B60W 20/15 |

(Continued)

*Primary Examiner* — Hitesh Patel
*Assistant Examiner* — Terry C Buse
(74) *Attorney, Agent, or Firm* — Dickinson Wright PLLC

(57) ABSTRACT

A method for controlling vehicle propulsion includes receiving signal data corresponding to a signaled intersection of a route being traversed by a vehicle. The method further includes determining an intersection propulsion profile for the signaled intersection based on at least a current vehicle speed and the signal data. The method further includes determining, based on the intersection propulsion profile, whether to deviate from a vehicle energy consumption profile corresponding to the route being traversed by the vehicle. The method further includes, in response to a determination to deviate from the vehicle energy consumption profile, selectively controlling vehicle propulsion of the vehicle according to the intersection propulsion profile. The method further includes, in response to traversing the intersection, selectively controlling vehicle propulsion according to the vehicle energy consumption profile.

18 Claims, 9 Drawing Sheets

(56)            References Cited

U.S. PATENT DOCUMENTS

| | | | |
|---|---|---|---|
| 2021/0097780 A1* | 4/2021 | Aherne | .................. H04L 67/12 |
| 2021/0318691 A1* | 10/2021 | Amini | ................. G05D 1/0223 |
| 2021/0382492 A1* | 12/2021 | Park | ....................... B60L 58/13 |
| 2022/0299328 A1* | 9/2022 | Pankov | ........... G08G 1/096833 |
| 2023/0066396 A1* | 3/2023 | Lee | ........................ B60L 8/003 |
| 2023/0139003 A1* | 5/2023 | Bhasme | ............. B60L 15/2045 |
| | | | 701/533 |

* cited by examiner

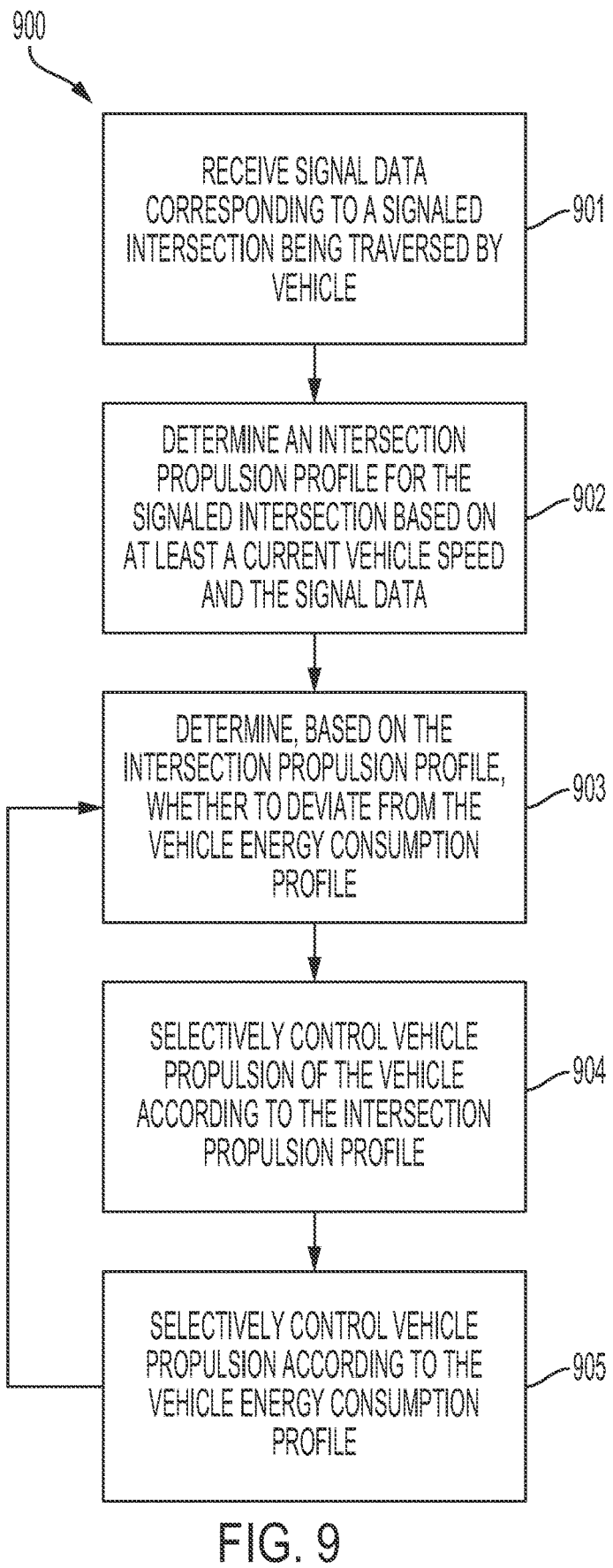

900

RECEIVE SIGNAL DATA CORRESPONDING TO A SIGNALED INTERSECTION BEING TRAVERSED BY VEHICLE — 901

DETERMINE AN INTERSECTION PROPULSION PROFILE FOR THE SIGNALED INTERSECTION BASED ON AT LEAST A CURRENT VEHICLE SPEED AND THE SIGNAL DATA — 902

DETERMINE, BASED ON THE INTERSECTION PROPULSION PROFILE, WHETHER TO DEVIATE FROM THE VEHICLE ENERGY CONSUMPTION PROFILE — 903

SELECTIVELY CONTROL VEHICLE PROPULSION OF THE VEHICLE ACCORDING TO THE INTERSECTION PROPULSION PROFILE — 904

SELECTIVELY CONTROL VEHICLE PROPULSION ACCORDING TO THE VEHICLE ENERGY CONSUMPTION PROFILE — 905

FIG. 9

SYSTEMS AND METHODS FOR ECO-APPROACH AND DEPARTURE AT A SIGNALIZED INTERSECTION USING VEHICLE DYNAMICS AND POWERTRAIN CONTROL WITH MULTIPLE HORIZON OPTIMIZATION

GOVERNMENT LICENSE RIGHTS

This invention was made with government support under the DE-AR0000794 contract awarded by United States Department of Energy, Advanced Research Projects Agency (ARPA-E). The government has certain rights in the invention.

TECHNICAL FIELD

This disclosure relates to vehicle energy usage optimization, and in particular to systems and methods for eco-approach and departure at a signalized intersection using vehicle dynamics and powertrain control with multiple horizon optimization.

BACKGROUND

Vehicles, such as cars, trucks, sport utility vehicles, cross-overs, mini-vans, commercial vehicles, military vehicles, or other suitable vehicles, include a powertrain system that includes, for example, a propulsion unit, a transmission, drive shafts, wheels, and other suitable components. The propulsion unit may include an internal combustion engine, a fuel cell, one or more electric motors, and the like. A hybrid vehicle may include a powertrain system comprising more than one propulsion unit. For example, a hybrid vehicle may include an internal combustion engine and an electric motor that cooperatively operate to propel the vehicle. The vehicle may also include a plug-in hybrid electric vehicle (PHEV), fuel cell electric vehicle (FCEV) or a battery electric vehicle (BEV).

An operator of the vehicle may interact with a computing device, such as personal computing device, a mobile computing device, or a computing device integrated into the vehicle, to select a route between the vehicle's current location (e.g., or other starting or initial location) and a desired destination location. For example, the operator may provide information (e.g., an address, global positioning coordinates, and the like) to the computing device indicating a starting location (e.g., or initial location or origin) and a desired destination. Additionally, or alternatively, the current location of the vehicle may be determined by the computing device and the desired destination may be suggested or provided by the computing device (e.g., based on travel history, time of day, etc.) or the operator may provide the desired destination. The computing device may identify routes between a starting location or the vehicle's current location (e.g., determined using a global position system or other suitable system) and the desired destination and present the identified routes to the operator.

SUMMARY

This disclosure generally relates to eco-approach and departure systems and methods at a signalized intersection.

An aspect of the disclosed embodiments is a method for controlling vehicle propulsion. The method includes receiving signal data corresponding to a signaled intersection of a route being traversed by a vehicle. The method further includes determining an intersection propulsion profile for the signaled intersection based on at least a current vehicle speed and the signal data. The method further includes determining, based on the intersection propulsion profile, whether to deviate from a vehicle energy consumption profile corresponding to the route being traversed by the vehicle. The method further includes, in response to a determination to deviate from the vehicle energy consumption profile, selectively controlling vehicle propulsion of the vehicle according to the intersection propulsion profile. The method further includes, in response to traversing the intersection, selectively controlling vehicle propulsion according to the vehicle energy consumption profile.

Another aspect of the disclosed embodiments is a system for controlling vehicle propulsion. The system includes a memory and a processor. The memory includes instructions executable by the processor to: receive signal data corresponding to a signaled intersection of a route being traversed by a vehicle; determine an intersection propulsion profile for the signaled intersection based on at least a current vehicle speed and the signal data; determine, based on the intersection propulsion profile, whether to deviate from a vehicle energy consumption profile corresponding to the route being traversed by the vehicle; in response to a determination to deviate from the vehicle energy consumption profile, selectively control vehicle propulsion of the vehicle according to the intersection propulsion profile; and in response to traversing the intersection, selectively control vehicle propulsion according to the vehicle energy consumption profile.

Another aspect of the disclosed embodiments is an apparatus for controlling vehicle propulsion. The apparatus includes a memory and a processor. The memory includes instructions executable by the processor to: receive signal data corresponding to a signaled intersection of a route being traversed by a vehicle; determine an intersection propulsion profile for the signaled intersection based on at least a current vehicle speed and the signal data; determine, based on the intersection propulsion profile, whether to deviate from a vehicle energy consumption profile corresponding to the route being traversed by the vehicle; in response to a determination to deviate from the vehicle energy consumption profile, selectively control vehicle propulsion of the vehicle according to the intersection propulsion profile; in response to traversing the intersection, modify, based on at least one of the signal data and the intersection propulsion profile, the vehicle energy consumption profile; and selectively control vehicle propulsion according to the modified vehicle energy consumption profile.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 9 is a flow diagram generally illustrating an eco-approach and departure method at a signalized intersection according to the principles of the present disclosure.

DETAILED DESCRIPTION

Figure 1:
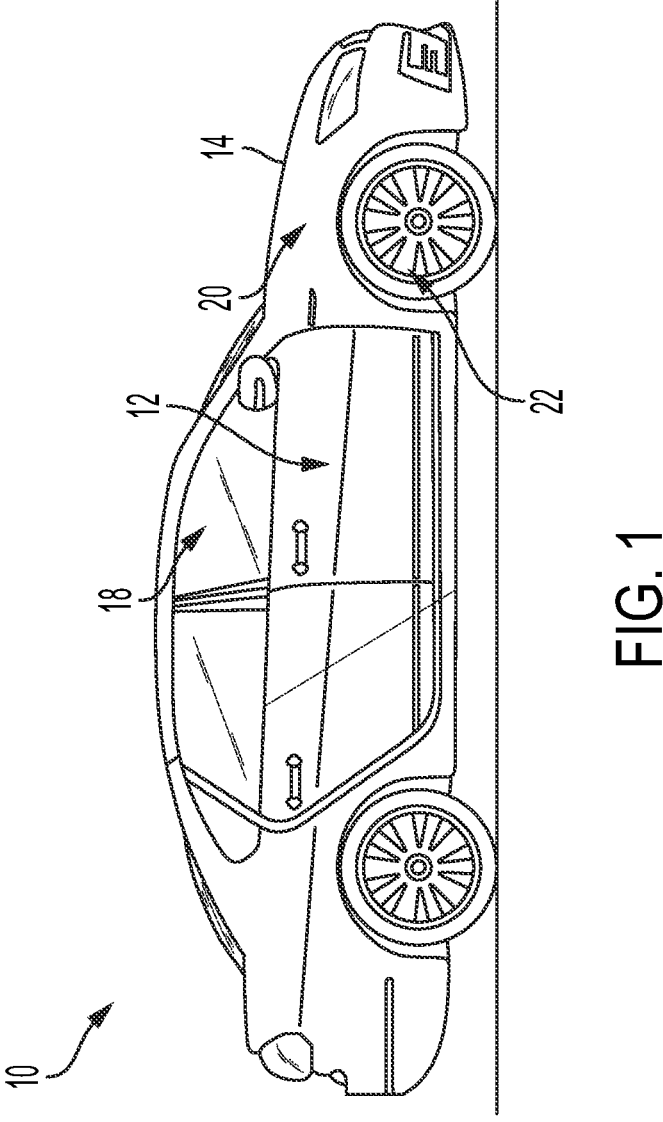
FIG. 1 generally illustrates a vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, commercial vehicles, military vehicles, or other suitable vehicles, include a powertrain system that includes, for example, a propulsion unit, a transmission, drive shafts, wheels, and other suitable components. The propulsion unit may include an internal combustion engine, a fuel cell, one or more electric motors, and the like. A hybrid vehicle may include a powertrain system comprising more than one propulsion unit. For example, a hybrid vehicle may include an internal combustion engine and an electric motor that cooperatively operate to propel the vehicle. The vehicle may also include a PHEV or a BEV. Additionally, or alternatively, the vehicle may include one or more fuel cells associated with propulsion system of the vehicle.

An operator of the vehicle may interact with a computing device, such as personal computing device, a mobile computing device, or a computing device integrated into the vehicle, to select a route between the vehicle's current location (e.g., or other starting or initial location) and a desired destination location. For example, the operator may provide information (e.g., an address, global positioning coordinates, and the like) to the computing device indicating a starting (e.g., or initial location or origin) and the desired destination. Additionally, or alternatively, the current location of the vehicle may be determined by the computing device and the desired destination may be suggested or provided by the computing device (e.g., based on travel history, time of day, etc.) or the operator may provide the desired destination. The computing device may identify routes between a starting location or the vehicle's current location (e.g., determined using a global position system or other suitable system) and the desired destination and present the identified routes to the operator.

In order to reduce energy consumption in a vehicle, processes have been developed that optimize the operation of the vehicle over a route, based on enhanced route information (including speed limits, traffic and stop signs, grade and road curvature, roads intersection angle information, what is commonly known as route characteristic information, which may include cloud computing-based navigation information and/or other suitable characteristics or information, as described herein), by determining and providing optimized control inputs to the vehicle control systems. For example, systems have been developed, which aim to minimize energy consumption and travel time using look-ahead route characteristics between two designated locations. This may be achieved by co-optimizing the vehicle speed trajectory and propulsion system control strategy using various techniques.

One key challenge for determining the optimal vehicle speed trajectory and propulsion system control strategy over the full route is that the signal phase of the traffic signals or indicators at intersections or elsewhere along the route cannot be known during an initial analysis of the route (e.g., when the initial route optimization is performed at the start of the trip). Further, the signal phase and timing (SPaT) information of the traffic signals can be adaptive to the traffic flow, which may make it difficult to predict the SPAT information of the traffic signals. For traffic signals on a fixed schedule, the uncertainty associated with the actual travel time to a particular signaled intersection limits the ability to accurately predict the signal phase of the traffic signal at the beginning of the trip. These limitations can result in the reduction of potential energy consumption benefit. With increasing connectivity, automation and electrification, vehicles have access to larger data streams as well as the higher potential to improve the energy consumption by using efficient energy management strategies.

Accordingly, systems and methods, such as those described herein, configured to optimize vehicle speed trajectory and propulsion systems control strategy at signaled intersections, may be desirable.

In some embodiments, the systems and methods described herein may be configured to jointly optimize the vehicle speed trajectory and propulsion system control using an eco-approach and departure (EAD) strategy at signaled intersections. Further, in some embodiments, the EAD strategy at signaled intersection may be integrated with a multi-horizon optimization framework, with the availability of SPAT information (e.g., through vehicle-to-infrastructure (V2I) communication or other suitable communication or communication protocol). In some embodiments, the systems and methods described herein may be configured to use the EAD strategy, which may utilize suitable connectivity mechanisms, to obtain information that maximizes the possibility of passing the signal in green, and/or allows for an energy-efficient stop when passing in green is not possible.

In some embodiments, systems and methods described herein may be configured to use a heuristic strategy configured to ensure that the vehicle can pass-in-green at a signaled intersection by using SPAT information to generate distance-based speed constraints. The distance-based speed constraints can be used by a vehicle dynamics and powertrain (VD&PT) optimizer configured to compute an optimal speed profile and energy management strategy, which may effectively ensure that the vehicle approaches and departs from a signalized intersection in an energy-efficient manner, while minimizing stop times. The systems and methods described herein may be configured to, when the pass-in-green scenario is not possible, stop the vehicle in an optimum manner based on vehicle energy consumption.

In some embodiments, the vehicle may include or be equipped with a vehicle-to-everything (V2X) communication mechanism. The V2X communication mechanism may be configured to receive information from signalized intersections. In some embodiments, the vehicle may include an electronic control module configured to control various operations of the vehicle. The vehicle may include a driver assistance system that may be configured to communicate an optimal vehicle velocity to the driver or directly control the vehicle speed (e.g., such as a driver advisory system, cruise control, adaptive cruise control, and the like).

In some embodiments, the systems and methods described herein may be configured to integrate information from V2I communication into a VD&PT control framework that uses look-ahead optimization. In some embodiments, the systems and methods described herein may be configured to, using the V2I-augmented control framework, update the optimal solution periodically in response to the occurrence of real-world events along a route, such as traffic, signal phase at signaled intersections, dynamic speed limits, and the like. The systems and methods described herein may be configured to use SPaT information of an upcoming signaled intersection (e.g., which may be broadcasted through V2I communication to the vehicle) to generate feasible speed limit constraints that, once incorporated into the VD&PT controller, may induce the vehicle to either pass-in-green or efficiently stop in red.

In some embodiments, the systems and methods described herein may be configured to provide one or more safety constraints that ensure safe operation of the vehicle while maximizing a possibility of passing the signaled intersection in green (e.g., while accounting for the presence of preceding traffic, where suitable).

The systems and methods described herein may be configured to reduce travel times by increasing chances of arriving at the intersection within the green window and/or reduce traffic congestions at signalized intersections by avoiding long queues at the red light. The systems and methods described herein may be configured to improve energy consumption due in part to the vehicle, in some scenarios, not having to come to a complete stop at the signalized intersection. The systems and methods described herein may be configured to pave the way for evolution of speed advisories for advanced driver assistance systems (ADAS).

Figure 3:
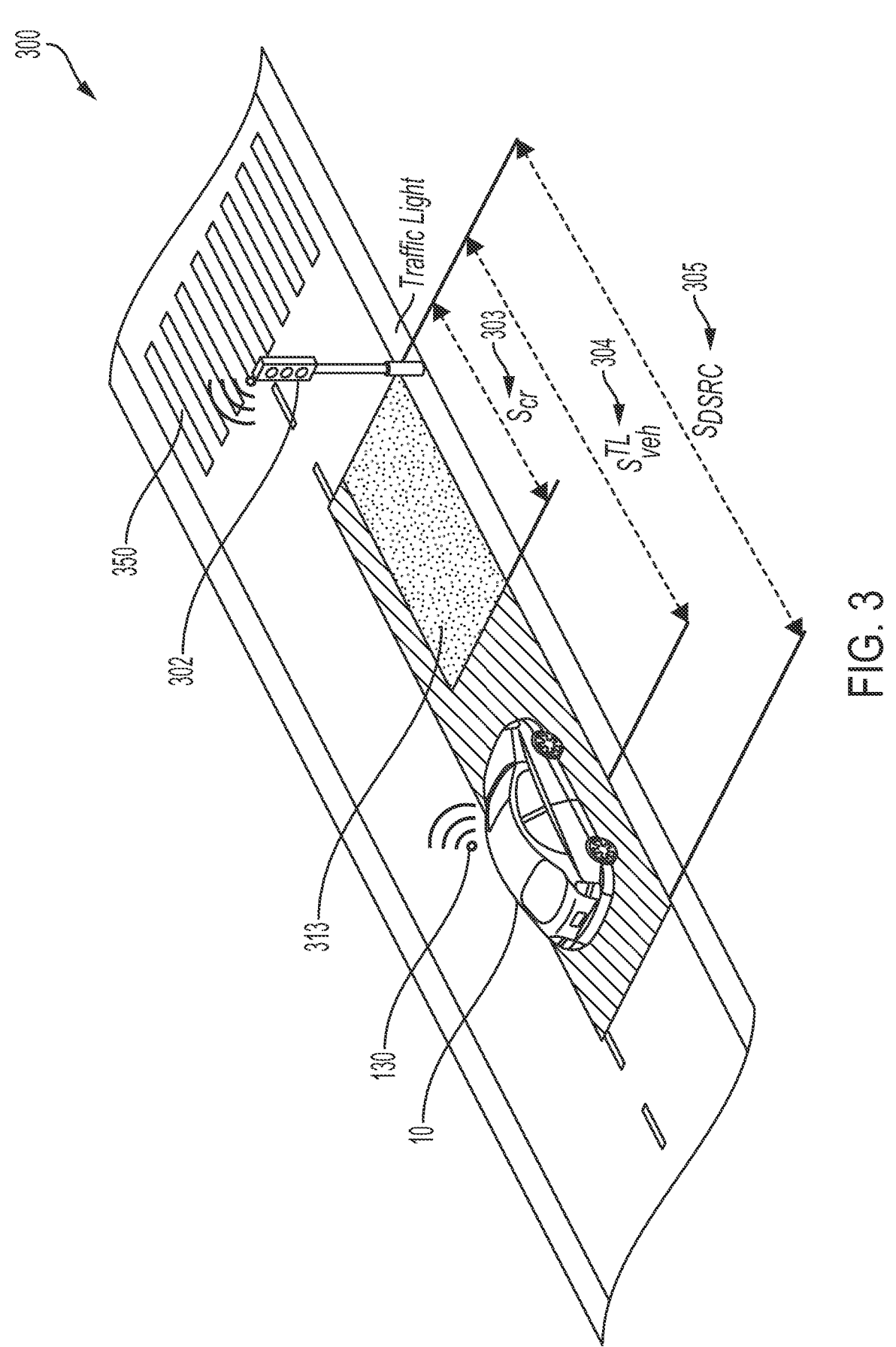
FIG. 3 generally illustrates a vehicle approaching a signalized intersection according to the principles of the present disclosure.

In some embodiments, the systems and methods described herein may be configured, using the EAD strategy, namely the PiG-e), (e.g. which may include a modular, deterministic algorithm) to determine kinematically feasible vehicle velocity constraints when the vehicle is within the communication range ($s_{DSRC}$) 305 of a signalized intersection, as is generally illustrated in FIG. 3.

In some embodiments, systems and methods described herein may be configured to categorize the approach of a vehicle to a traffic light 302 into two operating modes (e.g., a first mode, mode 1 600, and a second mode, mode 2 700). It should be understood that the systems and methods described herein may be configured to categorize the approach of the vehicle to the traffic light 302, or other suitable traffic light or signaled intersection, into any suitable number of modes.

In some embodiments, the systems and method described herein may be configured to receive signal data corresponding to a signaled intersection of a route being traversed by a vehicle. The signal data may include SPaT data, other suitable data, or a combination thereof. The signal data may correspond to cloud-computing based navigation information, traffic information, weather information, road condition information, other suitable information, or a combination thereof. The systems and methods described herein may be configured to receive the signal data via various communication protocols or sources, such as via vehicle-to-infrastructure communication, via vehicle-to-vehicle communication, via vehicle-to-everything communication, via one or more onboard sources (e.g., sources in or on the vehicle, such as sensors, processors, modules, controllers, and the like), via other suitable forms of communication or sources, or a combination thereof. The systems and methods described herein may be configured to use the signal data to indicate the current state of a traffic signal associated with the signaled intersection, signal timing of the traffic signal associated with the signaled intersection, other suitable information, or a combination thereof.

In some embodiments, the systems and methods described herein may also be configured to determine an intersection propulsion profile for the signaled intersection based on at least a current vehicle speed and the signal data. The systems and methods described herein may also be configured to determine an intersection propulsion profile for the signaled intersection based on current vehicle speed, signal data traffic data, weather conditions data, road condition data, other suitable data or information, or a combination thereof. The systems and methods described herein may be configured to determine the intersection propulsion profile, at least in part by multi-horizon optimization techniques, other suitable techniques, or a combination thereof.

The systems and methods described herein may also be configured to determine, based on the intersection propulsion profile, whether to deviate from a vehicle energy consumption profile corresponding to the route being traversed by the vehicle. The systems and methods described herein may also be configured, in response to a determination to deviate from the vehicle energy consumption profile, to selectively control vehicle propulsion of the vehicle according to the intersection propulsion profile. The systems and methods described herein may also be configured, in response to traversing the intersection, to selectively control vehicle propulsion according to the vehicle energy consumption profile.

The systems and methods described herein may be configured to selectively control vehicle propulsion according to the vehicle energy consumption profile, in response to traversing the signaled intersection, and may include: selectively adjusting the vehicle energy consumption profile based on intersection propulsion profile; and selectively controlling vehicle propulsion according to the adjusted vehicle energy consumption profile.

The systems and methods described herein may be configured to selectively control vehicle propulsion according to the vehicle energy consumption profile, in response to traversing the signaled intersection, and may include: selectively adjusting the vehicle energy consumption profile based on at least signal data corresponding to at least one other signaled intersection; and selectively controlling vehicle propulsion according to the adjusted vehicle energy consumption profile.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, any suitable military vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position.

The passenger compartment 18 may be disposed rearward of the engine compartment 20. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system. In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system.

In some embodiments, the vehicle 10 includes a transmission in communication with a crankshaft via a flywheel, clutch, or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22.

When the vehicle 10 includes one or more electric motors, a vehicle battery, and/or fuel cell provides energy to the electric motors to turn the wheels 22. In cases where the vehicle 10 includes a vehicle battery to provide energy to the one or more electric motors, when the battery is depleted, it may be connected to an electric grid (e.g., using a wall socket) to recharge the battery cells. Additionally, or alternatively, the vehicle 10 may employ regenerative braking which uses the one or more electric motors of the vehicle 10 as a generator to convert kinetic energy lost due to decelerating back into stored energy in the battery. In some embodiments, the vehicle 10 may include an electric vehicle configured to receive energy directly from a suitable electric grid (e.g., using a pantograph or other suitable mechanism or technique).

The vehicle 10 may include automatic vehicle propulsion systems, such as a cruise control, an adaptive cruise control module or mechanism, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

Figure 2:
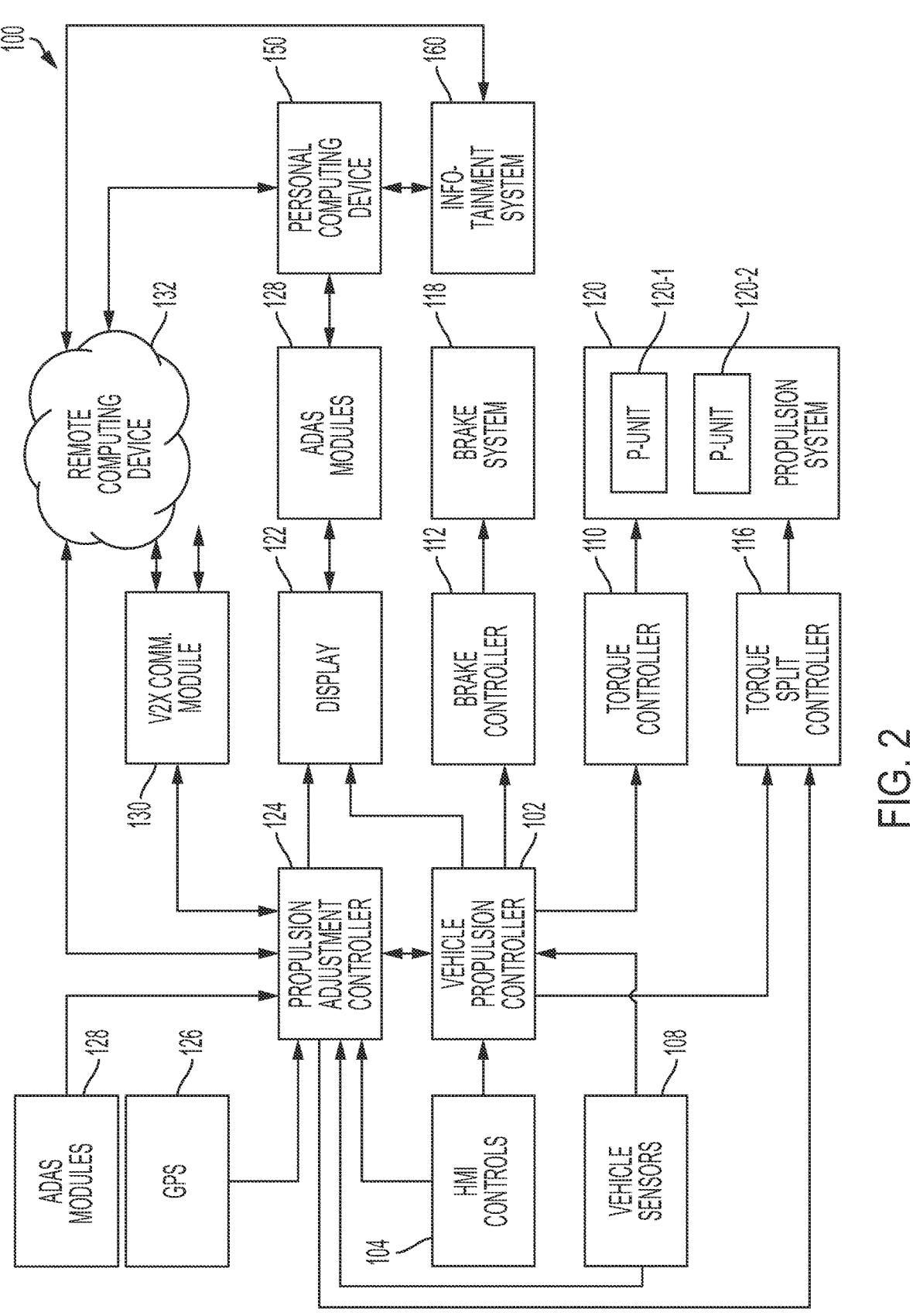
FIG. 2 generally illustrates a block diagram of a vehicle system according to the principles of the present disclosure.

FIG. 2 generally illustrates a block diagram of a vehicle system 100 according to the principles of the present disclosure. The system 100 may be disposed within a vehicle, such as the vehicle 10. The system 100 may be configured to selectively control propulsion of the vehicle 10 and, in some embodiments, the system 100 is configured to determine profiles for a target vehicle speed and/or a target vehicle torque split based on various input information (e.g., route information, vehicle characteristic information, traffic information, other suitable information, or a combination thereof). The profiles of the target vehicle speed and/or the target vehicle torque split correspond to a vehicle speed at which the vehicle 10 achieves an optimum energy consumption efficiency with respect to a portion of a route being traversed by the vehicle 10.

In some embodiments, the system 100 may include a vehicle propulsion controller (VPC) 102, human machine interface (HMI) controls 104, vehicle sensors 108, a torque controller 110, a brake controller 112, a torque split controller 116, a brake system 118, a propulsion system 120, and a display 122. In some embodiments, the display 122 may include a portion of a dash or console of the vehicle 10, a navigation display of the vehicle 10, or other suitable displays of the vehicle 10. In some embodiments, the display 122 may be disposed on a computing device, such as a mobile computing device used by the operator. In some embodiments, the system 100 may include a propulsion adjustment controller (PAC) 124, a global position system (GPS) 126 antenna in communication with a mapping characteristics module (not shown), advanced driver assistance system (ADAS) modules 128, and a vehicle to other systems (V2X) communication module 130. The V2X communication module 130 may be configured to communicate with other vehicles, other infrastructure (e.g., such as traffic infrastructure, mobile computing devices, and/or other suitable infrastructure), a remote computing device (e.g., the remote computing device 132), other suitable systems, or a combination thereof.

As will be described, in some embodiments, the system 100 may be in communication with one or more remote computing devices 132. In some embodiments, at least some of the components of the system 100 may be disposed in a propulsion control module (PCM) or other onboard vehicle-computing device. For example, at least the PAC 124 and the VPC 102 may be disposed within the PCM. In some embodiments, the system 100 may be at least partially disposed within the PCM while other components of the system 100 are disposed on a standalone computing device having a memory that stores instructions that when executed by a processor cause the processor to carry out the operations of the components. For example, the PAC 124 may be disposed on a memory and executed by a processor. It should be understood that the system 100 may include any combination of computing devices, either disposed locally in the vehicle 10 and/or disposed remotely, including mobile computing devices, as will be described.

In some embodiments, the VPC 102 may include an automatic vehicle propulsion system. For example, the VPC 102 may include a cruise control mechanism, an adaptive cruise control mechanism, an automatic braking system, other suitable automatic vehicle propulsion system, or a combination thereof. Additionally, or alternatively, the VPC 102 may include or be a portion of an autonomous vehicle system that controls all or a portion of vehicle propulsion, steering, braking, safety, route management, other autonomous features, or a combination thereof. It should be understood that, while only limited components of the system 100 are illustrated, the system 100 may include additional autonomous components or other suitable components.

The VPC 102 is in communication with one or more human to machine interfaces (HMI) 104. The HMI controls 104 may include any suitable HMI. For example, the HMI controls 104 may include a plurality of switches disposed on a steering wheel of the vehicle 10, on the dash or console of the vehicle 10, or any other suitable location on the vehicle 10. In some embodiments, the HMI controls 104 may be disposed on a mobile computing device, such as a smart phone, tablet, laptop computer, or other suitable mobile computing device. In some embodiments, the operator of the vehicle 10 may interface with the HMI controls 104 to use the VPC 102 to control vehicle propulsion and/or other features of the VPC 102. For example, the operator may actuate an HMI switch of the HMI controls 104 disposed on the steering wheel of the vehicle 10. The HMI controls 104 may communicate a signal to the VPC 102.

The signal may indicate a desired vehicle speed selected by the operator. The VPC 102 generates a torque demand corresponding to the desired vehicle speed and communicates the torque demand to a torque controller 110. The torque controller 110 is in communication with the propulsion system 120 and/or other vehicle propulsion systems of the vehicle 10. The torque controller 110 selectively controls the propulsion system 120 and/or the other vehicle propulsion systems using the torque demand to achieve the desired vehicle speed. The operator may increase or decrease the desired vehicle speed by actuating additional switches of the HMI controls 104. The VPC 102 may adjust the torque demand to achieve the increase or decrease in the desired vehicle speed.

The VPC 102 may continuously adjust the torque demand in order to maintain the desired vehicle speed. For example, the VPC 102 may be in communication with the vehicle sensors 108. The vehicle sensors 108 may include cameras, speed sensors, proximity sensors, other suitable sensors as will be described, or a combination thereof. The VPC 102 may receive a signal from the vehicle sensors 108 that indicates a current vehicle speed. The VPC 102 may adjust the torque demand to adjust the vehicle speed when the signal indicates that the current vehicle speed is different from the desired vehicle speed. For example, the vehicle 10 may traverse an incline that causes the vehicle 10 to reduce current vehicle speed (e.g., because the torque demand applied by the torque controller 110 is insufficient to maintain vehicle speed while on the incline). The VPC 102 may increase the torque demand in order adjust the current vehicle speed, thereby achieving the desired vehicle speed.

In some embodiments, such as when the VPC 102 includes an adaptive cruise control mechanism, the VPC 102 may adjust the torque demand based on the proximity of a lead vehicle (e.g., a vehicle immediately in front of the vehicle 10). For example, the VPC 102 may receive information from the vehicle sensors 108 indicating the presence of a lead vehicle. The information may be captured by the vehicle sensors 108 using cameras, proximity sensors, radar, the V2X communication module 130, other suitable sensors or input devices, or a combination thereof. The VPC 102 may determine whether to maintain the desired vehicle speed or increase or decrease the torque demand in order to increase or decrease the current vehicle speed. For example, the operator may indicate, using the HMI controls 104, to maintain pace with the lead vehicle while keeping a safe stopping distance between the vehicle 10 and the lead vehicle. The VPC 102 may selectively increase the torque demand if the lead vehicle is traveling faster than the vehicle 10 and may selectively decrease the torque demand if the lead vehicle is traveling slower relative to the vehicle 10.

The VPC 102 may bring the vehicle 10 to a complete stop when the lead vehicle comes to a complete stop. For example, the VPC 102 may be in communication with the brake controller 112 to send a plurality of signals over a period indicating to the brake controller 112 to control vehicle braking (e.g., the VPC 102 may bring the vehicle to a stop over a period so as not to suddenly stop the vehicle, however, in the case of a sudden stop of the lead vehicle, the VPC 102 brings the vehicle 10 to a sudden stop to avoid collision with the lead vehicle). The brake controller 112 may be in communication with the brake system 118. The brake system 118 may include a plurality of brake components that are actuated in response to the brake controller 112 implementing braking procedures based on the plurality of signals from the VPC 102.

In some embodiments, the VPC 102 may implement engine braking and/or braking via one or more electric motors through a regenerative braking system by adjusting the torque demand to allow the vehicle 10 to come to a stop without use of the brake system 118 or the VPC 102 may use a combination of regenerative braking and the brake system 118 to bring the vehicle 10 to a complete stop. In order to resume vehicle propulsion control, the operator indicates to resume vehicle propulsion control using the HMI controls 104 (e.g., the VPC 102 is not configured to resume vehicle propulsion control without interaction from the operator). In some embodiments, the vehicle 10 may include a higher level of automation including a higher level of propulsion control, as described, and may include suitable controls for bringing the vehicle 10 to a complete stop without interaction with the operator of the vehicle 10.

In some embodiments, the VPC 102 may provide the torque demand to the torque split controller 116. The torque split controller 116 may determine a torque split in order to utilize a first propulsion unit 120-1 and a second propulsion unit 120-2. In some embodiments, the first propulsion unit 120-1 may include an electric motor and the second propulsion unit 120-2 may include an internal combustion engine. It should be understood that while only an internal combustion engine and an electric motor are described, the vehicle 10 may include any hybrid combination of any suitable vehicle engines and motors. The torque split indicates a portion of the torque demand to be applied to the first propulsion unit 120-1 and a portion of the torque demand to be applied to the second propulsion unit 120-2. For example, the electric motor may be used alone for vehicle propulsion when the torque demand is below a threshold. However, the internal combustion engine may provide at least a portion of vehicle propulsion in order to assist the electric motor. The torque split controller 116 is in communication with the propulsion system 120, and accordingly, with the first propulsion unit 120-1 and the second propulsion unit 120-2, to apply the torque split.

In some embodiments, the VPC 102 includes a plurality of safety controls. For example, the VPC 102 may determine whether to increase or decrease the torque demand, thereby increasing or decreasing the desired vehicle speed or current vehicle speed, based on input from the safety controls. The safety controls may receive input from the vehicle sensors 108. For example, the safety controls may receive proximity sensor information, camera information, other information, or a combination thereof and may generate a safety signal that indicates to the VPC 102 to perform one or more safety operations. For example, in the case of a lead vehicle coming to a sudden stop, the safety controls may generate a safety signal, based on proximity information from the vehicle sensors 108, indicating to the VPC 102 to immediately bring the vehicle 10 to a complete stop.

In some embodiments, the VPC 102 may determine whether to apply the desired vehicle speed set by the operator using the HMI controls 104 based on the signal from the safety controls. For example, the operator may increase the desired vehicle speed, which may bring the vehicle 10 closer to the lead vehicle (e.g., the vehicle 10 would travel faster than the lead vehicle if the desired vehicle speed were achieved). The VPC 102 may determine not to apply the desired vehicle speed, and instead may provide an indication to the display 122 indicating to the operator that increasing the desired vehicle speed may be unsafe or the VPC 102 may ignore the increase in the desired vehicle speed. In some embodiments, the VPC 102 may be in communication with a transmission controller module (TCM). The VPC 102 may receive information from the TCM (e.g., an automatically selected gear) and may determine and/or adjust the total torque demand based on the information received from the TCM.

In some embodiments, the system 100 includes a personal computing device 150. The personal computing device 150 may include any suitable computing device, such as a mobile computing device (e.g., smart phone, tablet, laptop, and the like), a computing device integrated into the vehicle 10 (e.g., such as a computing device integrated with other various electronic or computing infrastructure of the vehicle 10 and/or another controller disposed within the vehicle 0) or any other suitable computing device. The personal computing device 150 may include at least one processor and at least one memory. The at least one memory may include instructions that, when executed by the at least one processor, cause the processor to perform various functions, such as those described herein.

The personal computing device 150 may be configured to receive various input information, such as vehicle input information, vehicle starting location, vehicle desired destination, route characteristic information, energy cost information, operator labor cost information, other suitable input information, or any combination thereof. The personal computing device 150 is configured to determine a plurality of routes corresponding to the starting location and the desired destination location and provide the plurality of routes as selectable options to the operator of the vehicle 10. The plurality of routes may include additional information, such as a total route distance, a total route driving time, a total route energy cost, a total route labor cost, other suitable information, or a combination thereof, as will be described. While personal computing device 150 is described as being configured to generate the plurality of routes and provide the plurality of routes to the operator of the vehicle, the PAC 124 may be configured to generate the plurality of routes and provide the plurality of routes to the operator, the personal computing device 150 may cooperatively operate with the PAC 124 to receive the various input information and to generate the plurality of routes, or any other suitable computing device, vehicle component, or any combination thereof may receive the various inputs and provide the plurality of routes to the operator.

In some embodiments, the personal computing device 150 receives route characteristics (e.g., road grade characteristics, route distance, and route directions), vehicle parameters, traffic characteristics, weather characteristics, vehicle-to-vehicle parameters, other information or characteristics, or a combination thereof. The personal computing device 150 may receive at least some of the route characteristics from a mapping characteristics module based on location information from the GPS antenna 126. The mapping characteristics module may be disposed within the vehicle 10 (e.g., within the system 100) or may be disposed on a remote computing device, such as the remote computing device 132. In some embodiments, the mapping characteristics module or other suitable module may be disposed on the personal computing device 150. The GPS antenna 126 may be disposed within the vehicle 10 or within the personal computing device 150 and may capture various global positioning signals from various global positioning satellites or other mechanisms. The GPS antenna 126 may communicate the captured signals to the mapping characteristics module. The mapping characteristics module may generate the route characteristics based on the signals received from the GPS antenna 126 or based on route characteristic information provided by the operator. For example, the personal computing device 150 may receive route characteristics corresponding to the starting location (e.g., or current location) of the vehicle 10 and a desired destination location of the vehicle 10. The route characteristics may include a route distance, route directions, road grade information of the route, other route characteristics, or a combination thereof. The personal computing device 150 may receive the route characteristics from the remote computing device 132. In some embodiments, the PAC 124 may receive traffic signal location information, traffic stop sign location information, posted speed limit information, lane shift information, other route characteristics or information, or a combination thereof, from the mapping characteristics module based on location information from the GPS antenna 126. The PAC 124 may communicate the information to the personal computing device 150.

The personal computing device 150 may receive at least some of the route characteristics from the ADAS modules 128. The ADAS modules 128 may assist the operator of the vehicle 10 to improve safety. The ADAS modules 128 may be configured to automate and/or adapt and enhance vehicle systems for safety and better driving. The ADAS modules 128 may be configured to alert the operator of the vehicle 10 of upcoming traffic conditions or disabled vehicles and/or to alert the vehicle 10 of a vehicle proximate to the vehicle 10 in order to avoid collisions and accidents. Further, the ADAS modules 128 may autonomously avoid collisions by implementing safeguards and taking over control of the vehicle 10, such as, by automatic lighting, initiating adaptive cruise control (e.g., via the VPC 102) and collision avoidance (e.g., by controlling a trajectory of the vehicle 10 or bringing the vehicle 10 to a complete stop either using the VPC 102 or directly using the brake controller 112). The PAC 124 may receive information, such as traffic characteristics, vehicle proximity information, disabled vehicle information, other suitable information, or a combination thereof, from the ADAS modules 128 and communicate the received route characteristics to the personal computing device 150. In some embodiments, the personal computing device 150 may omit receiving route characteristics from the ADAS modules 128.

The personal computing device 150 may receive, at least, some of the route characteristics from the V2X communication module 130. The V2X communication module 130 is configured to communicate with other systems proximate or remotely located from the vehicle 10, as described, to obtain, and share information, such as, traffic information, vehicle speed information, construction information, other information, or a combination thereof. The PAC 124 may receive other vehicle speed information, other vehicle location information, other traffic information, construction information, other suitable information, or a combination thereof, from the V2X communication module 130 and may communicate the information to personal computing device 150. In some embodiments, the personal computing device 150 may omit receiving the route characteristics from the V2X communication module 130.

The personal computing device 150 may receive further vehicle parameters from the vehicle sensors 108. For example, the vehicle sensors 108 may include an energy level sensor (e.g., a fuel level sensor or a battery charge sensor), an oil sensor, a speed sensor, a weight sensor, other suitable sensors, or a combination thereof. The PAC 124 may receive an energy level of the vehicle 10, a current weight of the vehicle 10, an oil condition of the vehicle 10, tire inflation information of the vehicle 10, a current vehicle speed, engine temperature information, other suitable vehicle parameters of the vehicle 10, or a combination thereof from the vehicle sensors 108 and may communicate the received information to the personal computing device 150. In some embodiments, the vehicle sensors 108 may include weather sensors, such as, a precipitation sensor or moisture sensor, a barometric pressure sensor, an ambient temperature sensor, other suitable sensors, or a combination thereof. The PAC 124 may receive current weather information, such as precipitation information, barometric pressure information, ambient temperature information, other suitable weather information, or a combination thereof, from the vehicle sensors 108 and may communicate the received information to the personal computing device 150. In some embodiments, the personal computing device 150 may omit receiving information from the vehicle sensors 108.

The personal computing device 150 may receive, at least, some of the route characteristics from the remote computing device 132. For example, the personal computing device 150 may receive information regarding route distance, route directions, road grade information of the route, traffic information, construction information, other vehicle location information, other vehicle speed information, vehicle maintenance information of the vehicle 10, other route characteristics, or a combination thereof, from the remote computing device 132. Additionally, or alternatively, the personal computing device 150 may receive vehicle parameters from the remote computing device 132, such as, a make of the vehicle 10, model of the vehicle 10, propulsion configuration of the vehicle 10, manufacturer provided energy consumption efficiency of the vehicle 10, a weight of the vehicle 10, other vehicle parameters, or a combination thereof. In some embodiments, the personal computing device 150 may receive traffic signal location information, stop sign location information, posted speed limit information, lane shift information, other route characteristics or information, or a combination thereof, from the remote computing device 132. The remote computing device 132 may include any suitable computing device or devices, such as a cloud computing device or system, a remotely located server or servers, a remotely or proximately located mobile computing device or application server that provides information to the personal computing device 150. The remote computing device 132 is remotely located from the vehicle 10, such as in a datacenter or other suitable location.

The personal computing device 150 may receive route characteristics, vehicle parameters, and/or energy cost information from an operator of the vehicle 10. For example, the operator may interact with an interface of the personal computing device 150, such as using the display of the personal computing device 150 or using the display 122 of the vehicle, to provide vehicle parameters of the vehicle 10, such as, vehicle weight, vehicle make and model, vehicle age, vehicle maintenance information, vehicle identification number, a number of passengers, load information (e.g., an amount of luggage or other load information), other vehicle parameters, or a combination thereof. Additionally, or alternatively, the operator may provide route characteristics, such as a route map, route distance, other route characteristics, or a combination thereof, to the personal computing device 150.

In some embodiments, the personal computing device 150 learns behavior of the operator of the vehicle 10. For example, the personal computing device 150 monitors the operator's vehicle speed relative to posted speed limits. In some embodiments, the operator may provide a labor cost associated with the operator. For example, the operator may provide the operator's hourly wage or salary. Additionally, or alternatively, the operator may provide a personal value of time or other suitable representation of per unit time cost. As will be described, the personal computing device 150 may determine a time cost for a route of the vehicle 10 using the operator's labor cost.

In some embodiments, the personal computing device 150 may learn traffic patterns for known routes traversed by the vehicle 10. For example, the PAC 124 may track traffic conditions while the vehicle 10 traverses one or more routes on a routine or regular basis. The personal computing device 150 may determine traffic patterns for the routes based on the monitored traffic conditions. In some embodiments, the personal computing device 150 receives traffic patterns for a route the vehicle 10 is traversing from the remote computing device 132, or from the mapping characteristics module based on the signals from the GPS antenna 126, as described It should be understood that the personal computing device 150 may receive any characteristics or information associated with routes, traffic, signage and signals, other vehicles, vehicle parameters of the vehicle 10, any other suitable characteristics or information, including those described or not described here, from any of the components described or not described herein. Additionally, or alternatively, the personal computing device 150 may be configured to learn any suitable characteristics or information described or not described herein.

Typically, vehicles, such as the vehicle 10, include an infotainment system, such as a vehicle infotainment system 160 (e.g., integrated into the vehicle dash, an application on a mobile computing device, or a combination thereof). The infotainment system 160 may be configured to provide infotainment services, such as navigation services, entertainment services (e.g., movie or music playback, access to the Internet, and so on), or other suitable infotainment services. The infotainment system 160 may be configured to display the infotainment services to the display 122 or other suitable display within the vehicle 10.

In some embodiments, the infotainment system 160 may be configured to provide the operator of the vehicle 10 with the ability to select between route alternatives for a desired destination location (e.g., a destination the operator of the vehicle 10 provides to the infotainment system 160 or the personal computing device 150 as an input). Such route alternatives are typically displayed with a travel time and/or a travel distance, such that, the operator of the vehicle 10 may select a route based on how long it will take to traverse the route, the total traversable distance of the route, or a combination of both. Additionally, or alternatively, the operator of the vehicle 10 may be able to provide preference information, such that the personal computing device 150 may provide route alternatives based on the preferences (e.g., to avoid toll roads, use highways where available, and the like). In some embodiments, the personal computing device 150 may communicate with the infotainment system 160 and may provide the route alternatives to the operator using the infotainment system 160, the display of the personal computing device 150, or a combination thereof.

In some embodiments, the PAC 124 may receive signal data corresponding to a signaled intersection 350, as is generally illustrated in FIG. 3, of a route being traversed by the vehicle 10 from a signal 302 at the signalized intersection 350, or otherwise as described. The signal data may include SPaT data, other suitable data, or a combination thereof. The signal data may correspond to route characteristic information (e.g., including cloud computing-based navigation information and the like) traffic information, weather information, road condition information, other suitable information, or a combination thereof.

The PAC 124 may receive the signal data via vehicle-to-infrastructure communication, vehicle-to-vehicle communication, vehicle-to-everything communication, other suitable forms of communication, or a combination thereof. The PAC 124 may use the signal data to indicate the current state of the traffic signal 302 associated with the signaled intersection 350, signal timing of the traffic signal 302 associated with the signaled intersection 350, other suitable information, or a combination thereof.

The PAC 124 may determine an intersection propulsion profile for the signaled intersection 350 based on at least a current vehicle speed and the signal data. The PAC 124 may determine an intersection propulsion profile for the signaled intersection 350 based on current vehicle speed, signal data traffic data, weather conditions data, road condition data, other suitable data or information, or a combination thereof. The PAC 124 may determine the intersection propulsion profile, at least in part by multi-horizon optimization, other suitable programming or multi-horizon techniques, or a combination thereof.

The PAC 124 may determine, based on the intersection propulsion profile, whether to deviate from a vehicle energy consumption profile corresponding to the route being traversed by the vehicle 10. The PAC 124 may, in response to a determination to deviate from the vehicle energy consumption profile, selectively control vehicle propulsion of the vehicle 10 according to the intersection propulsion profile. The PAC 124 may, in response to traversing the intersection 350, selectively control vehicle propulsion according to the vehicle energy consumption profile.

In some embodiments, the PAC 124 selectively control vehicle propulsion according to the vehicle energy consumption profile and may include selectively adjusting the vehicle energy consumption profile based on intersection propulsion profile, selectively controlling vehicle propulsion according to the adjusted vehicle energy consumption profile, selectively adjusting the vehicle energy consumption profile based on at least signal data corresponding to at least one other signaled intersection 350, selectively controlling vehicle propulsion according to the adjusted vehicle energy consumption profile, other suitable control aspects of the vehicle 10 based on the vehicle energy consumption profile, or a combination thereof.

FIG. 3 generally illustrates a vehicle, such as the vehicle 10, approaching a signalized intersection 350 according to the principles of the present disclosure. In some embodiments, the EAD strategy namely, PiG-e 423 is a modular, deterministic algorithm that determines kinematically feasible vehicle velocity constraints when the vehicle is within a communication range ($s_{DSRC}$) 305 of a signaled intersection 350. The signaled intersection 350 may be an intersecting road or street, a railroad crossing, a crosswalk, any other type of signaled intersection, and the like.

In some embodiments, the GPS 126, the V2X module 130, the vehicle sensors 108, the remote computing device 132, the personal computing device 150, other suitable devices, or a combination thereof may be configured to determine a distance to the traffic light, $$s_{veh}^{TL}$$

304 and a critical breaking distance, $s_{cr}$ 303. The distance to the traffic light, $$s_{veh}^{TL}$$

304 and the critical breaking distance, $s_{cr}$ 303, may be communicated to the propulsion adjustment controller using the GPS 126, the V2X module 130, the vehicle sensors 108, the remote computing device 132, the personal computing device 150, other suitable devices, or a combination thereof. In some embodiments, when the phase of the traffic light is yellow, the critical breaking distance 303, $$s_{cr} = \frac{v_{veh}^2}{2a_{min}},$$

is compared with the distance to the traffic light 304. In some embodiments, when the distance to the traffic light 304 is greater than the critical breaking distance 303, the systems and methods described herein may be configured to use the PAC 124 to selectively control the vehicle propulsion causing the vehicle 10 to come to a stop at the signaled intersection 350. In some embodiments, when the distance to the traffic light 304 is less than the critical breaking distance 303, the systems and methods described herein may be configured to use the PAC 124 to selectively control the vehicle propulsion causing the vehicle 10 to continue and pass through the signaled intersection 350.

Figure 4:
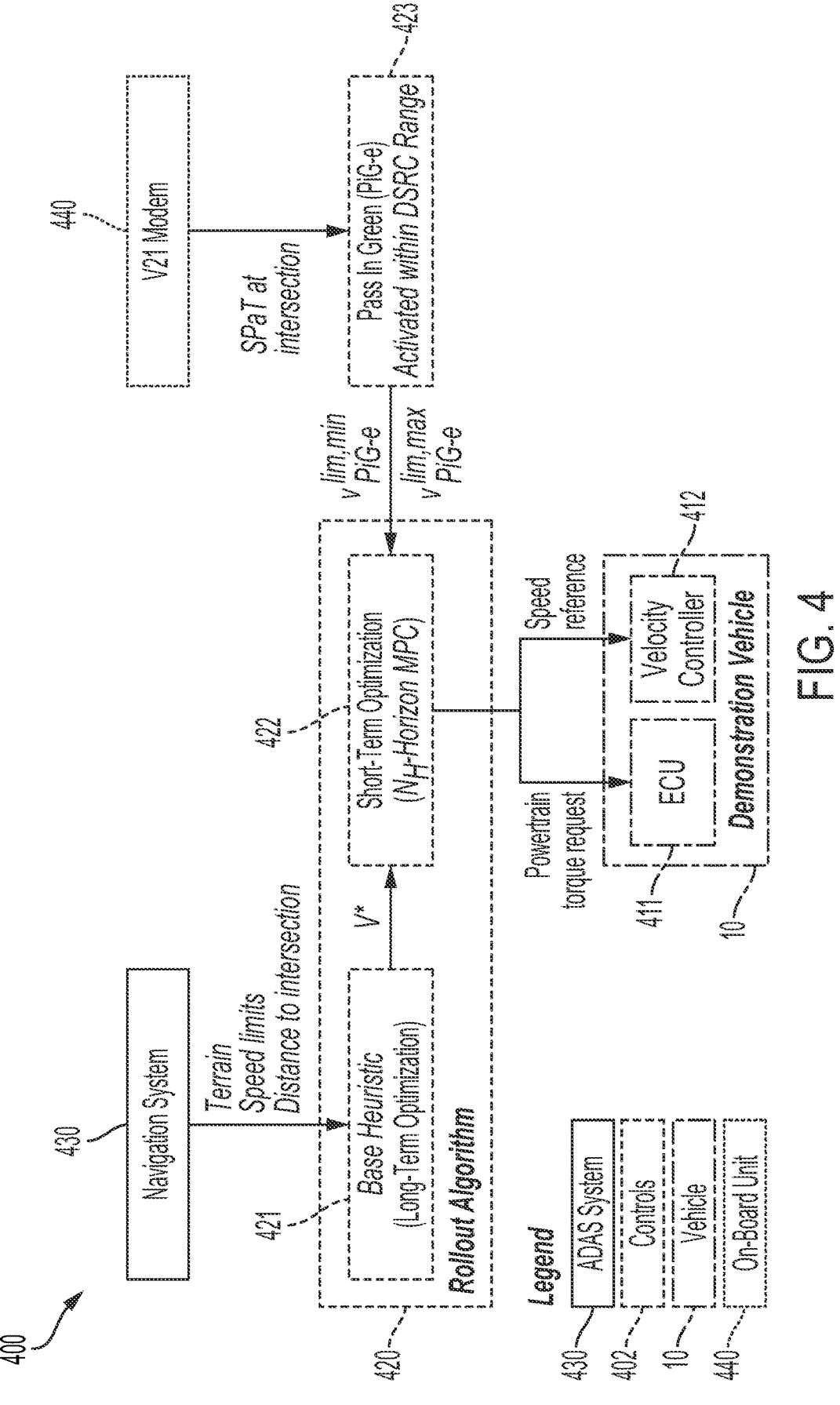
FIG. 4 generally illustrates a block diagram of the integration of a pass-in-green environment (PiG-e) with a vehicle dynamics and powertrain (VD&PT) optimizer according to the principles of the present disclosure.

FIG. 4 generally illustrates a block diagram of the integration of a PiG-e module 423 with a VD&PT optimizer 420 according to the principles of the present disclosure. In some embodiments, the integration of a PiG-e module 423 with a VD&PT optimizer 420 may include an ADAS system 430, a demonstration vehicle 10, controls 402, and an on-board unit 440. In some embodiments, the ADAS system 430 may include a navigation system 430. In some embodiments, a velocity controller 412, and an electronic control unit (ECU) 411 may be disposed in the vehicle 10. In some embodiments the controls 402 may include a pass-in-green environment (PiG-e) module 423, a short-term optimization module 422, and a base heuristic module 421. In some embodiments the on-board unit (OBU) 440 may include a V2I modem 440.

In some embodiments, the PAC 124 may be configured to use the base heuristic module 421 to receive route characteristics from the navigation system 430 such as terrain information, speed limits, distance to intersections, other information or characteristics, or a combination thereof. The PAC 124 may use the PiG-e module 423 to receive SPAT information from the V2I modem 440. The PAC 124 may use the short-term optimization module 422 to receive information from the base heuristic module 421 and the PiG-e module 423, and to determine, based on at least that information, a short-term optimal policy.

In some embodiments, the PAC 124 may receive the short-term optimal policy from the short-term optimization module 422. The PAC 124 may use the ECU 411 to receive a powertrain torque request and the velocity controller to receive a speed reference from the short-term optimization module 422.

In some embodiments, the PAC 124 may be configured to extend the look-ahead energy optimization framework to incorporate deterministic and statistically relevant information on traffic and SPaT conditions from V2I communication. Additionally, or alternatively, the PAC 124 may use the PiG-e 423 as a bridge between the vehicle on-board unit (OBU) and the VD&PT optimizer. The main inputs to the PiG-e 423 are the current phase and timing (e.g., the SPaT information) for a corresponding signaled intersection (e.g., including the time remaining in a current phase of the signal). The PAC 124 may use a dedicated short-range communication (DSRC) modem to receive the current phase and timing (e.g., the SPAT information) for the corresponding signaled intersection (e.g., including the time remaining in the current phase of the signal) using V2I communication. The PAC 124 may use the PiG-e to determine the kinematically feasible speed limit constraints for the VD&PT optimizer based on the current phase and timing (e.g., the SPaT information) for the corresponding signaled intersection (e.g., including the time remaining in the current phase of the signal) and the current vehicle velocity. Additionally, or alternately, in some embodiments, the PAC 124 may use the PiG-e to provide the scenario as an output, and dictate if the vehicle 10 needs to stop at an upcoming traffic light or (attempt to) pass-in-green.

In some embodiments, in the hierarchical multi-horizon optimization framework shown in FIG. 4, the PAC 124 may use the short-term MPC 422 to solve the optimization problem, while enforcing distance, velocity, torque limit and acceleration constraints. The PAC 124 may use the information of the upcoming signaled intersection to reshape the speed limit constraints to ensure the vehicle 10 passes through the upcoming signalized intersection in the green phase.

Figure 5:
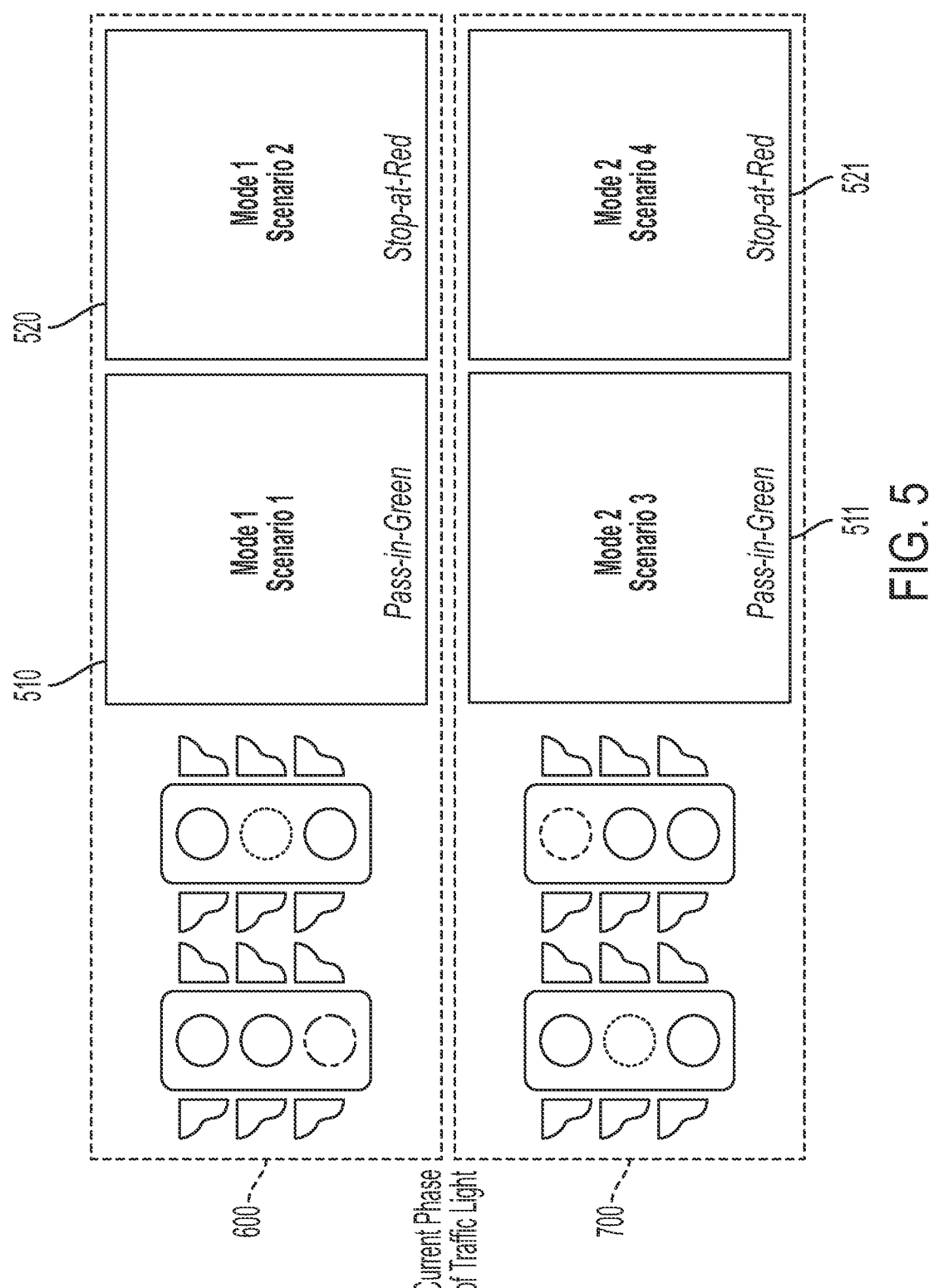
FIG. 5 is a diagram generally illustrating the modes and scenarios in the PiG-e according to the principles of the present disclosure.

FIG. 5 is a diagram generally illustrating the modes and scenarios in the PiG-e according to the principles of the present disclosure. In some embodiments, the modes may include a mode 1 600 and a mode 2 700. The scenarios may include scenario 1 510, scenario 2 520, scenario 3 511, and scenario 4 521. Mode 1 may correspond to a green or yellow current state of the traffic light 302. Mode 2 may correspond to a red or yellow current state of the traffic light 302. Scenario 1 and scenario 3 may correspond to a pass-in-green strategy under Mode 1 and 2 respectively at the signaled intersection 350. Scenario 2 and scenario 4 may correspond to a stop-at-red strategy under Mode 1 and 2 respectively at the signaled intersection 350.

Figure 6:
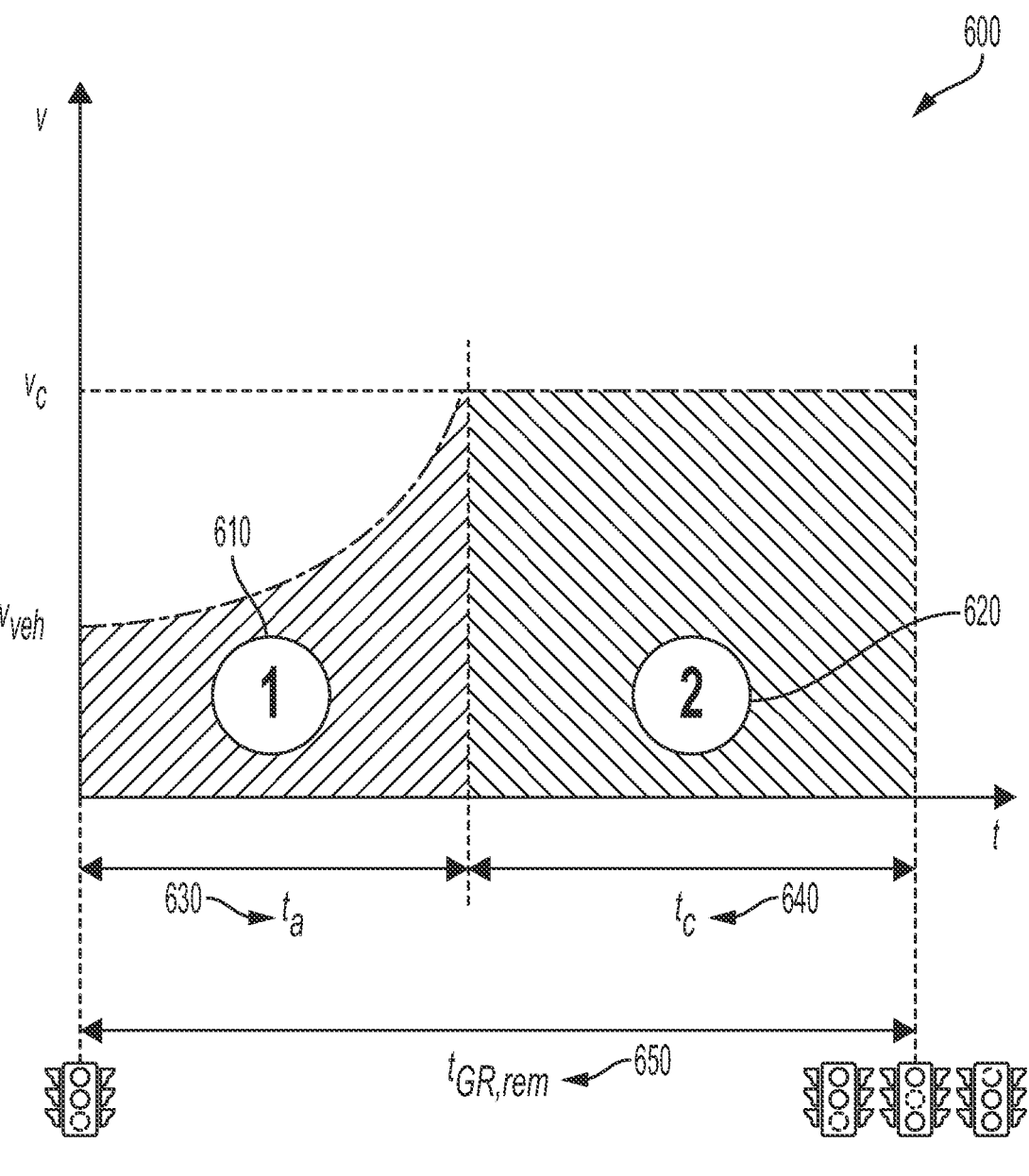
FIG. 6 is a diagram generally illustrating the kinematic speed constraints in Mode 1 according to the principles of the present disclosure.

FIG. 6 is a diagram generally illustrating the kinematic speed constraints in mode 1 600 according to the principles of the present disclosure. Mode 1 600 may be activated when the current phase of the traffic light 302 is green or yellow. Mode 1 600 may include a time period of acceleration, ta 630, corresponding to the acceleration region 610 and a time period of cruising, $t_c$ 640, corresponding to the cruising region 620. Mode 1 600 may include the time remaining in the current green and yellow phase, $t_{GR,rem}$ 650.

Mode 1 600 may be activated when the current phase of the traffic light 302 is green or yellow. The vehicle 10 may, given the time remaining in the current green or yellow phase, $t_{GR,rem}$ 650 and distance to the traffic light, $$s_{veh}^{TL}$$

304, arrive at the intersection within $t_{GR,rem}$ 650. The approach of the vehicle 10 to the intersection may be divided into two different maneuvers: (1) an acceleration region 610 (shaded region 1) where the vehicle 10 accelerates to a higher velocity if necessary to pass-in-green, and (2) a cruising region 620 (shaded region 2) where the vehicle 10 cruises to ensure it passes-in-green.

In some embodiments, the PAC 124 may use a tunable tolerance ($\varepsilon_1 \leq 1$) to control how aggressively the vehicle 10 maneuvers to the intersection. For example, if ($\varepsilon_1=1$), the PAC 124 will target having the vehicle 10 arrive just before the light turns red, while if ($\varepsilon_1<1$), the PAC 124 will target having the vehicle 10 pass through in green or yellow with some time to spare before the light turns red. Additionally, or alternatively, the PAC 124 may use the value of ($\varepsilon_1$) as a parameter that can be tuned by the driver, based on a desired aggressiveness or other driving style. Additionally, or alternatively, the PAC 124 may learn (e.g., using any suitable technique, such as machine learning and the like), various behaviors of the operator of the vehicle 10 at signalized intersections. The PAC 124 may tune the parameter based on the various learned behaviors.

In some embodiments, the time spent in the two regions of FIG. 6, $t_a$ 630 and $t_c$ 640 may be constrained by $t_{GR,rem}$ 650 as:

$$t_a+t_c=\varepsilon_1\cdot t_{GR,rem}$$

In some embodiments, the vehicle 10 may accelerate with a maximum acceleration, $a_{max}$. The PAC 124 may determine the value of the maximum allowed acceleration, which may be made a parameter available to be tuned by control calibrations, based on a desired aggressiveness for this maneuver. Additionally, or alternatively, the PAC 124 may adapt the maximum allowed acceleration based on information about lead vehicles, for example, from V2V communications, camera or radar systems, to avoid the vehicle 10 accelerating and then having to slow down when encountering a lead vehicle. The PAC 124 may, integrated with a level 1 automation (e.g., or higher) application, use the vehicle speed controller unit to override the optimized vehicle speed target according its own safety and convenience criteria.

In some embodiments, the sum of the acceleration region 610 (shaded region 1 FIG. 6) and the cruising region 620 (shaded region 2 FIG. 6) provides the total distance traveled during the maneuver until reaching the intersection, which must be equal to the distance to the intersection at any time instant:

$$s_{veh}^{TL} = v_{veh} \cdot t_a + \frac{1}{2} a_{max} \cdot t_a^2 + v_c \cdot t_c$$

The constant velocity may be obtained by using kinematic equation of motion:

$$v_c = v_{veh} + a_{max} t_a$$

Solving the above set of equations, $t_a$ 630 can be determined in a closed form explicitly as:

$$t_a = \epsilon_1 \cdot t_{GR,rem} - \sqrt{\left(\epsilon_1 \cdot t_{GR,rem}\right)^2 + 2 \cdot \left(\frac{v_{veh} \cdot \epsilon_1 \cdot t_{GR,rem} - s_{veh}^{TL}}{a_{max}}\right)}$$

In some embodiments, depending upon the existence of the $t_a$ 630, two sub-cases or scenarios are possible. In scenario 1 510 (Im($t_a$)=0), where Im(•) denotes the imaginary part of the argument, the vehicle 10 may accelerate or cruise at the same speed to arrive at the traffic light within the green window, ($t_{GR,rem}$>0). This may be done by raising the minimum speed limit during the maneuver in a kinematically feasible manner while ensuring no violation of the route speed limits. In scenario 2 520 (Im($t_a$)≠0), where Im(•) denotes the imaginary part of the argument, based on the route constraints and SPaT information, there is no feasible velocity trajectory that allows the vehicle 10 to pass through the signaled intersection in the current green window, so the vehicle may maneuver smoothly to a stop at the signalized intersection.

Figure 7:
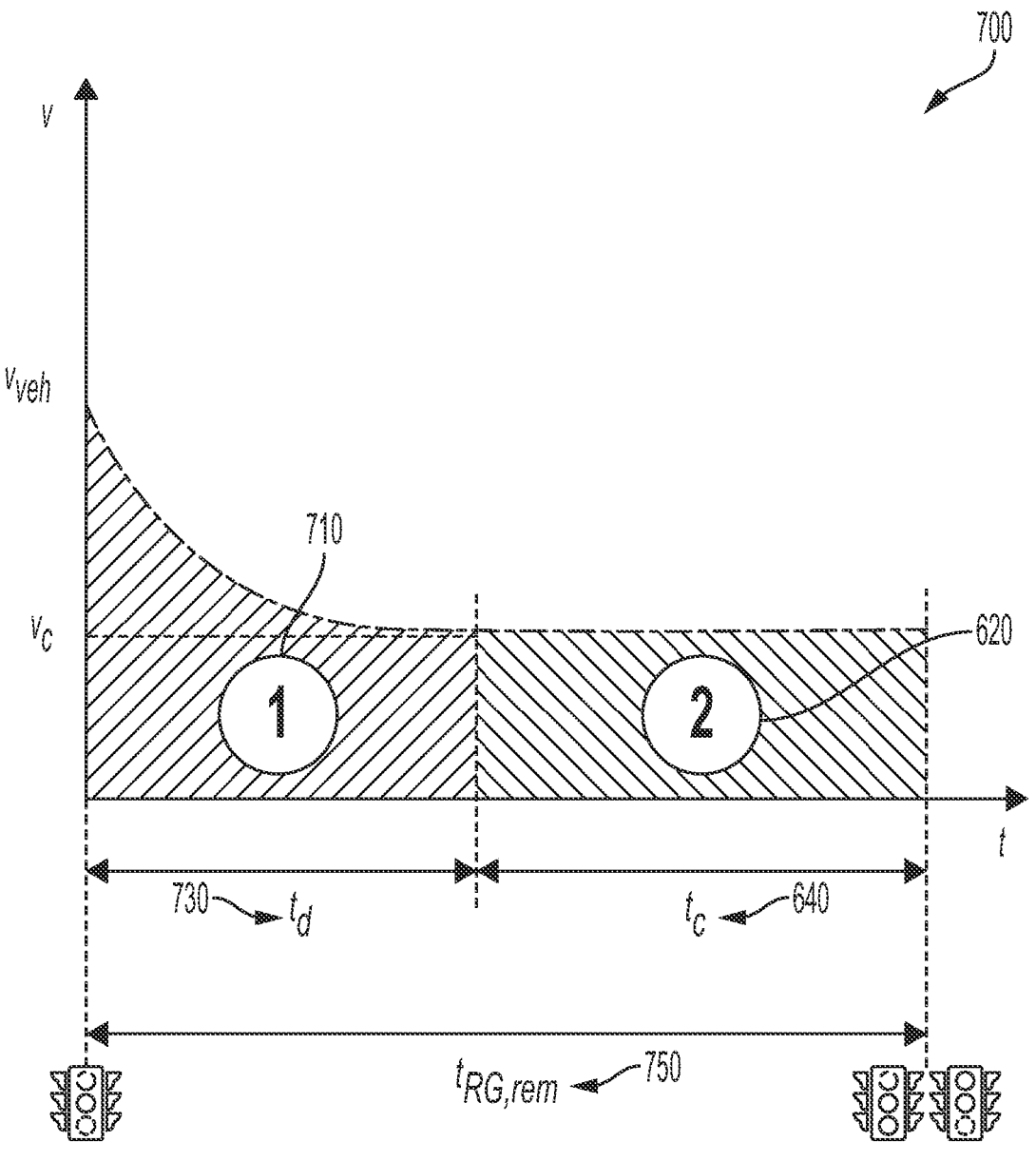
FIG. 7 is a diagram generally illustrating the kinematic speed constraints in Mode 2 according to the principles of the present disclosure.

FIG. 7 is a diagram generally illustrating the kinematic speed constraints in Mode 2 according to the principles of the present disclosure. In some embodiments, Mode 2 700 may be activated when the current phase of the traffic light 302 is yellow or red. In some embodiments, Mode 2 700 may include a time period of deceleration, $t_d$ 730, corresponding to the deceleration region 710 and a time period of cruising, $t_c$ 640, corresponding to the cruising region 620. In some embodiments, Mode 2 700 may include the time remaining in the current red phase, $t_{RG,rem}$ 750.

In some embodiments, mode 2 700 may be activated when the current phase of the traffic light 302 is yellow or red. In some embodiments, given the time remaining in the current yellow or red phase, $t_{RG,rem}$ 750 and distance to the traffic light, $$s_{veh}^{TL}$$

304, the PAC 124 may control the vehicle 10 to arrive at the intersection after $t_{RG,rem}$ 750. The approach of the vehicle 10 to the intersection may be divided into two different maneuvers: a deceleration region 710 (shaded region 1 FIG. 7) where the vehicle 10 may decelerates to a lower velocity and a cruising region 620 (shaded region 2 FIG. 7) where the vehicle 10 cruises to ensure it passes-in-green. In some embodiments, the PAC 124 may use a tunable tolerance ($\epsilon_2$≥1) to control how aggressively the vehicle 10 maneuvers to the intersection; if ($\epsilon_2$=1), the PAC 124 targets having the vehicle 10 arrive just after the light turns green, while if ($\epsilon_2$>1), the PAC 124 targets having the vehicle 10 pass through in green with some time after the light changes from red. The PAC 124 may use the value of ($\epsilon_2$) as a parameter that can be tuned by the driver, based on a desired aggressiveness or other suitable driving style.

In some embodiments, the time spent in the two regions of FIG. 7, $t_d$ 730 and $t_c$ 640 may be constrained by $t_{RG,rem}$ 750 as:

$$t_d + t_c = \epsilon_2 \cdot t_{RG,rem}$$

It may be assumed that the vehicle 10 can decelerate with a maximum deceleration, amin. The value of the maximum allowed deceleration may be made a parameter available to be tuned by control calibrations, based on a desired aggressiveness for this maneuver. The maximum allowed deceleration may be adapted based on information about trailing vehicles, for example, from V2V, camera or radar systems, to promote a smooth passage of traffic.

In some embodiments, the sum of the deceleration region 710 (shaded region 1 FIG. 7) and the cruising region 620 (shaded region 2 FIG. 7) provides the total distance traveled in the maneuver until the intersection which must be equal to the distance to the intersection at any time instant:

$$s_{veh}^{TL} = v_{veh} \cdot t_d - \frac{1}{2} a_{min} \cdot t_d^2 + v_c \cdot t_c$$

The constant velocity may be obtained by using kinematic equation of motion:

$$v_c = v_{veh} - a_{min} t_d$$

Solving the above set of equations, $t_d$ 730 can be determined in a closed form explicitly as:

$$t_d = \epsilon_2 \cdot t_{RG,rem} - \sqrt{\left(\epsilon_2 \cdot t_{RG,rem}\right)^2 - 2 \cdot \left(\frac{v_{veh} \cdot \epsilon_2 \cdot t_{RG,rem} - s_{veh}^{TL}}{a_{min}}\right)}$$

In some embodiments, depending upon the existence of the $t_d$ 730, two sub-cases are possible. In scenario 3 511 (Im($t_d$)=0), where Im(•) denotes the imaginary part of the argument, the vehicle 10 may decelerate to a lower velocity (ensuring following traffic is not impeded) or cruise to arrive at the signalized intersection after the red window has elapsed. This may involve lowering the maximum route speed limit constraints in a kinematically feasible manner. In scenario 4 521 (Im($t_d$)≠0), where Im(•) denotes the imaginary part of the argument, based on the route constraints and SPaT information, there is no feasible velocity trajectory that allows the vehicle 10 to pass through the signalized intersection in the upcoming green window without coming to a stop, so the vehicle 10 may maneuver smoothly to a stop at the signalized intersection.

In some embodiments, when the current phase of the traffic light 302 is yellow, the distance to the traffic light $$s_{veh}^{TL}$$

304 may be compared with the critical braking distance, $s_{cr}$ 303, where $$s_{cr} = \frac{v_{veh}^2}{2 a_{min}}.$$

If the vehicle 10 is outside the critical braking zone 313

$$\left(s_{veh}^{TL} \geq s_{cr}\right),$$

the PAC 124 may use scenario 4 521 and the traffic light may be treated as a stop sign. If the vehicle 10 is within the critical braking zone 313 when the traffic light 302 is in the yellow phase $$\left(\text{i.e. } s_{veh}^{TL} \geq s_{cr}\right),$$

it cannot safely come to a stop without obstructing the upcoming intersection, the PAC 124 may use scenario 1 510 in an attempt to pass the intersection. In some embodiments, PiG-e 423 may contain two calibration terms ($\varepsilon_1$, $\varepsilon_2$) that define how aggressively a driver would brake or accelerate to arrive at a signaled intersection.

In scenario 1 510 and scenario 3 511, the maneuver may be split into regions of constant acceleration-constant velocity and constant deceleration-constant velocity respectively, ensuring that the speed constraints change in a kinematically feasible manner and meet the safety-critical applications of approach and departure at a signalized intersection.

Figure 8:
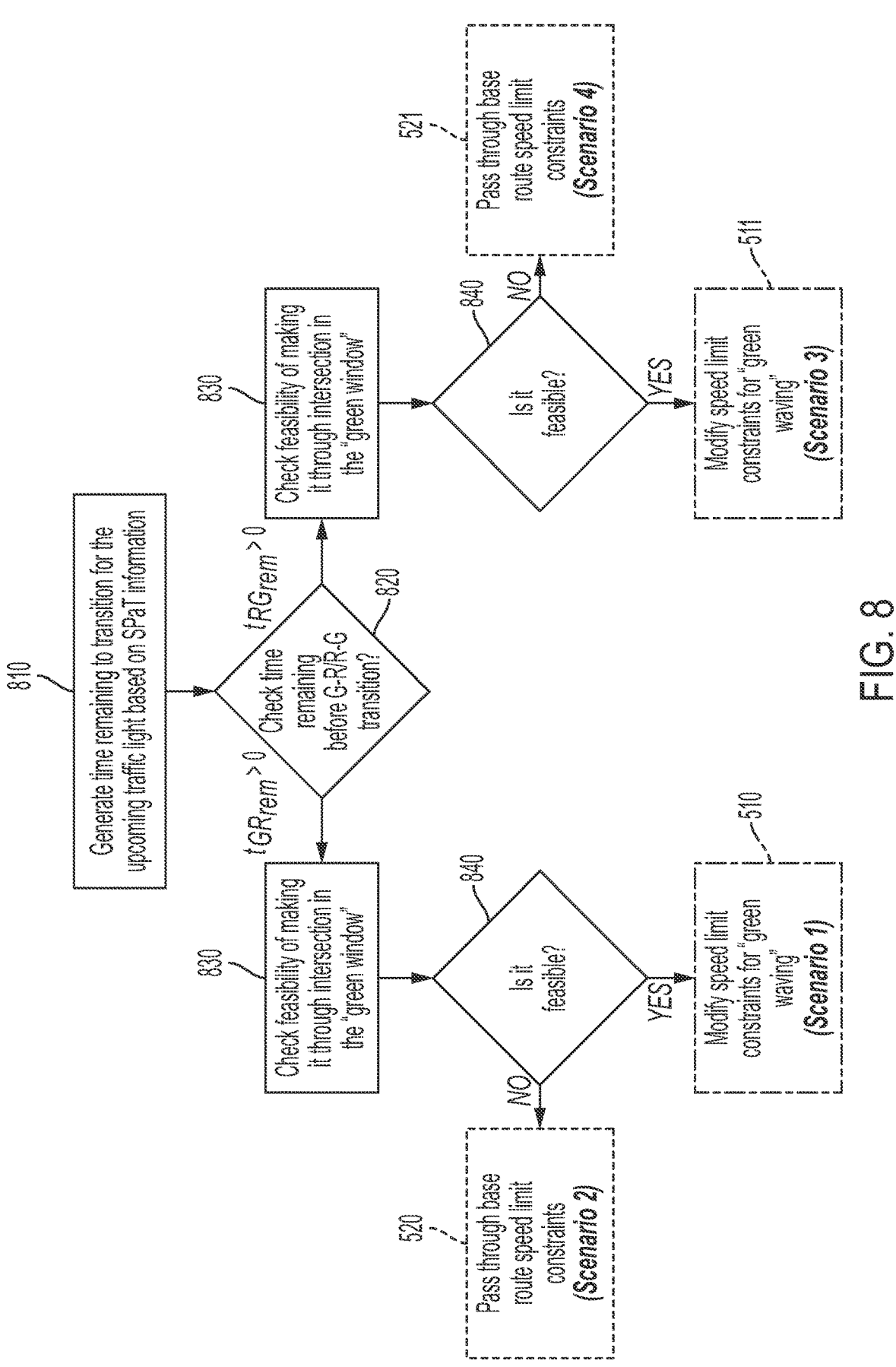
FIG. 8 generally illustrates a flow diagram of the interaction of possible scenarios in Mode 1 and Mode 2 of the PiG-e according to the principles of the present disclosure.

FIG. 8 generally illustrates a flow diagram of the interaction of different modes and scenarios in the PiG-e 423 according to the principles of the present disclosure. In some embodiments, at 810, the PAC 124 may use the PiG-e 423 to generate a time remaining to transition for the upcoming traffic light on SPaT information. At 820, the PAC 124 may use the PiG-e 423 to check the time remaining before the green-yellow to red or red to green transition. At 830, the PAC 124 may use the PiG-e to check the feasibility of making it through the intersection 350 in the "green window." At 840, the PAC 124 may use the PiG-e to determine if it is feasible.

At scenario 2 520, before a green-yellow to red transition, the PAC 124 may use the PiG-e to pass through base route speed limit constraints. At scenario 1 510, before a green-yellow to red transition, the PAC 124 may use the PiG-e to modify speed limit constraints for passing in green at the upcoming signalized intersection. At scenario 4 520, before a red to green transition, the PAC 124 may use the PiG-e to pass through base route speed limit constraints. At scenario 3 510, before a red to green transition, the PAC 124 may use the PiG-e to modify speed limit constraints for passing in green.

In some embodiments, the system 100 and/or the PAC 124 may perform the methods described herein. However, the methods described herein as performed by the personal computing device are not meant to be limiting, and any type of software executed on a controller can perform the methods described herein without departing from the scope of this disclosure. For example, a controller, such as a processor executing software within a computing device onboard the vehicle 10, can perform the methods described herein.

FIG. 9 is a flow diagram generally illustrating an eco-approach and departure method 900 at a signalized intersection according to the principles of the present disclosure. At 901, the method 900 receives signal data corresponding to a signaled intersection 350 being traversed by vehicle 10. For example, the PAC 124 may use the personal computing device 150 to receive SPaT information, location and positioning information, other types of suitable information, or any combination thereof. The PAC 124 may use the personal computing device 150 to receive signal data from any component or source described herein.

At 902, the method 900 determines an intersection propulsion profile for the signaled intersection based on at least a current vehicle speed and the signal data. For example, the PAC 124 may use the vehicle sensors 108 and the remote computing device 132 to provide the current vehicle speed and the signal data to the PAC 124. The PAC 124 may use the propulsion adjustment controller to determine an intersection propulsion profile for the signaled intersection.

At 903, the method 900 determines, based on at least the intersection propulsion profile, whether or not to deviate from the vehicle energy consumption profile. For example, the PAC 124 may use the personal computing device 150 to determine whether or not to deviate from the vehicle energy consumption profile based on the intersection propulsion profile, the vehicle energy consumption profile, various route characteristics, such as road grades, traffic, speed limits, stop signs, traffic signals, other route characteristics, or a combination thereof.

At 904, the method 900 selectively controls vehicle propulsion of the vehicle 10 according to the intersection propulsion profile. For example, the PAC 124 may use the VPC 102 to selectively control vehicle propulsion of the vehicle 10.

At 905, the method 900 selectively controls vehicle propulsion according to the vehicle energy consumption profile. For example, the PAC 124 may use the VPC 102 to selectively control vehicle propulsion of the vehicle 10.

In some embodiments, a method for controlling vehicle propulsion includes receiving signal data corresponding to a signaled intersection of a route being traversed by a vehicle. The method also includes determining an intersection propulsion profile for the signaled intersection based on at least a current vehicle speed and the signal data. The method also includes determining, based on the intersection propulsion profile, whether to deviate from a vehicle energy consumption profile corresponding to the route being traversed by the vehicle. The method also includes, in response to a determination to deviate from the vehicle energy consumption profile, selectively controlling vehicle propulsion of the vehicle according to the intersection propulsion profile. The method also includes, in response to traversing the intersection, selectively controlling vehicle propulsion according to the vehicle energy consumption profile.

In some embodiments, the signal data includes SPAT data. In some embodiments, the signal data corresponds to cloud computing-based navigation information. In some embodiments, the intersection propulsion profile is determined at least in part by multi-horizon optimization. In some embodiments, the signal data is received via at least one of a vehicle-to-infrastructure communication, a vehicle-to-vehicle communication, and a vehicle-to-everything communication. In some embodiments, the signal data indicates at least one of a current state of a traffic signal associated with the signaled intersection and a signal timing of the traffic signal associated with the signaled intersection. In some embodiments, selectively controlling vehicle propulsion according to the vehicle energy consumption profile, in response to traversing the signaled intersection, includes: selectively adjusting the vehicle energy consumption profile based on intersection propulsion profile; and selectively controlling vehicle propulsion according to the adjusted vehicle energy consumption profile. In some embodiments, selectively controlling vehicle propulsion according to the vehicle energy consumption profile, in response to traversing the signaled intersection, includes: selectively adjusting the vehicle energy consumption profile based on at least signal data corresponding to at least one other signaled intersection; and selectively controlling vehicle propulsion according to the adjusted vehicle energy consumption profile.

In some embodiments, a system for controlling vehicle propulsion includes a memory and a processor. The memory includes instructions executable by the processor to: receive signal data corresponding to a signaled intersection of a route being traversed by a vehicle; determine an intersection propulsion profile for the signaled intersection based on at least a current vehicle speed and the signal data; determine, based on the intersection propulsion profile, whether to deviate from a vehicle energy consumption profile corresponding to the route being traversed by the vehicle; in response to a determination to deviate from the vehicle energy consumption profile, selectively control vehicle propulsion of the vehicle according to the intersection propulsion profile; and in response to traversing the intersection, selectively control vehicle propulsion according to the vehicle energy consumption profile. In some embodiments, the signal data includes SPaT data. In some embodiments, the signal data corresponds to cloud computing-based navigation information. In some embodiments, the intersection propulsion profile is determined at least in part by multi-horizon optimization.

In some embodiments, the signal data is received via at least one of a vehicle-to-infrastructure communication, vehicle-to-vehicle communication, and a vehicle-to-everything communication. In some embodiments, the signal data indicates at least one of a current state of a traffic signal associated with the signaled intersection and a signal timing of the traffic signal associated with the signaled intersection. In some embodiments, selectively controlling vehicle propulsion according to the vehicle energy consumption profile, in response to traversing the signaled intersection, includes: selectively adjusting the vehicle energy consumption profile based on intersection propulsion profile; and selectively controlling vehicle propulsion according to the adjusted vehicle energy consumption profile. In some embodiments, selectively controlling vehicle propulsion according to the vehicle energy consumption profile, in response to traversing the signaled intersection, includes: selectively adjusting the vehicle energy consumption profile based on at least signal data corresponding to at least one other signaled intersection; and selectively controlling vehicle propulsion according to the adjusted vehicle energy consumption profile.

In some embodiments, an apparatus for controlling vehicle propulsion includes a memory and a processor. The memory includes instructions executable by the processor to: receive signal data corresponding to a signaled intersection of a route being traversed by a vehicle; determine an intersection propulsion profile for the signaled intersection based on at least a current vehicle speed and the signal data; determine, based on the intersection propulsion profile, whether to deviate from a vehicle energy consumption profile corresponding to the route being traversed by the vehicle; in response to a determination to deviate from the vehicle energy consumption profile, selectively control vehicle propulsion of the vehicle according to the intersection propulsion profile; in response to traversing the intersection, modify, based on at least one of the signal data and the intersection propulsion profile, the vehicle energy consumption profile; and selectively control vehicle propulsion according to the modified vehicle energy consumption profile.

In some embodiments, the signal data includes SPAT data. The signal data is received via at least one of a vehicle-to-infrastructure communication, vehicle-to-vehicle communication, and a vehicle-to-everything communication. In some embodiments, the intersection propulsion profile is determined at least in part by multi-horizon optimization; and the signal data is received via at least one of a vehicle-to-infrastructure communication, vehicle-to-vehicle communication, and a vehicle-to-everything communication. In some embodiments, the signal data indicates at least one of a current state of a traffic signal associated with the signaled intersection and a signal timing of the traffic signal associated with the signaled intersection.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A method for controlling vehicle propulsion, the method comprising:

receiving signal data corresponding to a signaled intersection of a route being traversed by a vehicle;

determining a target vehicle speed profile for at least a portion of the route being traversed by the vehicle, based on at least one route characteristic associated with the portion of the route being traversed by the vehicle and a plurality of vehicle parameters, wherein the plurality of vehicle parameters includes at least a vehicle identification number, manufacturer provided energy consumption efficiency of the vehicle, and at least one of a vehicle weight, a vehicle make, a vehicle model, and vehicle age, and wherein at least some of vehicle parameters of the plurality of vehicle parameters are provided by a computing device remotely located from the vehicle;

determining a vehicle energy consumption profile based on the target vehicle speed profile;

determining an intersection propulsion profile for the signaled intersection based on at least a current vehicle speed and the signal data;

determining, based on the intersection propulsion profile, whether to deviate from the vehicle energy consumption profile corresponding to the route being traversed by the vehicle; and in response to a determination to deviate from the vehicle energy consumption profile:

selectively controlling vehicle propulsion of the vehicle according to the intersection propulsion profile; and in response to traversing the intersection, adjusting the vehicle energy consumption profile based on the intersection propulsion profile selectively controlling vehicle propulsion, after traversing the intersection, according to the adjusted vehicle energy consumption profile.

2. The method of claim 1, wherein the signal data includes Signal Phase and Timing (SPaT) data.

3. The method of claim 1, wherein the signal data corresponds to cloud computing-based navigation information.

4. The method of claim 1, wherein the intersection propulsion profile is determined at least in part by multi-horizon optimization.

5. The method of claim 1, wherein the signal data is received via at least one of a vehicle-to-infrastructure communication, a vehicle-to-vehicle communication, and a vehicle-to-everything communication.

6. The method of claim 1, wherein the signal data indicates at least one of a current state of a traffic signal associated with the signaled intersection and a signal timing of the traffic signal associated with the signaled intersection.

7. The method of claim 1, wherein selectively controlling vehicle propulsion according to the adjusted vehicle energy consumption profile, in response to traversing the signaled intersection, includes:

further selectively adjusting the adjusted vehicle energy consumption profile based on at least signal data corresponding to at least one other signaled intersection; and selectively controlling vehicle propulsion according to the further adjusted vehicle energy consumption profile.

8. A system for controlling vehicle propulsion comprising:

a memory; and a processor, wherein the memory includes instructions executable by the processor to:

receive signal data corresponding to a signaled intersection of a route being traversed by a vehicle;

determine a target vehicle speed profile for at least a portion of the route being traversed by the vehicle, based on at least one route characteristic associated with the portion of the route being traversed by the vehicle and a plurality of vehicle parameters wherein the plurality of vehicle parameters includes at least a vehicle identification number, manufacturer provided energy consumption efficiency of the vehicle, and at least one of a vehicle weight, a vehicle make, a vehicle model, and vehicle age, and wherein at least some of vehicle parameters of the plurality of vehicle parameters are provided by a computing device remotely located from the vehicle;

determine a vehicle energy consumption profile based on the target vehicle speed profile;

determine an intersection propulsion profile for the signaled intersection based on at least a current vehicle speed and the signal data;

determine, based on the intersection propulsion profile, whether to deviate from the vehicle energy consumption profile corresponding to the route being traversed by the vehicle; and in response to a determination to deviate from the vehicle energy consumption profile:

selectively control vehicle propulsion of the vehicle according to the intersection propulsion profile; and in response to traversing the intersection, adjust the vehicle energy consumption profile based on the intersection propulsion profile and selectively control vehicle propulsion, after traversing the intersection, according to the adjusted vehicle energy consumption profile.

9. The system of claim 8, wherein the signal data includes Signal Phase and Timing (SPaT) data.

10. The system of claim 8, wherein the signal data corresponds to cloud computing based navigation information.

11. The system of claim 8, wherein the intersection propulsion profile is determined at least in part by multi-horizon optimization.

12. The system of claim 8, wherein the signal data is received via at least one of a vehicle-to-infrastructure communication, vehicle-to-vehicle communication, and a vehicle-to-everything communication.

13. The system of claim 8, wherein the signal data indicates at least one of a current state of a traffic signal associated with the signaled intersection and a signal timing of the traffic signal associated with the signaled intersection.

14. The system of claim 8, wherein selectively controlling vehicle propulsion according to the adjusted vehicle energy consumption profile, in response to traversing the signaled intersection, includes:

further selectively adjusting the adjusted vehicle energy consumption profile based on at least signal data corresponding to at least one other signaled intersection; and selectively controlling vehicle propulsion according to the further adjusted vehicle energy consumption profile.

15. An apparatus for controlling vehicle propulsion comprising:

a memory; and a processor, wherein the memory includes instructions executable by the processor to:

receive signal data corresponding to a signaled intersection of a route being traversed by a vehicle;

determine a target vehicle speed profile for at least a portion of the route being traversed by the vehicle, based on at least one route characteristic associated with the portion of the route being traversed by the vehicle and a plurality of vehicle parameters wherein the plurality of vehicle parameters includes at least a vehicle identification number, manufacturer provided energy consumption efficiency of the vehicle, and at least one of a vehicle weight, a vehicle make, a vehicle model, and vehicle age, and wherein at least some of vehicle parameters of the plurality of vehicle parameters are provided by a computing device remotely located from the vehicle;

determine a vehicle energy consumption profile based on the target vehicle speed profile;

determine an intersection propulsion profile for the signaled intersection based on at least a current vehicle speed and the signal data;

determine, based on the intersection propulsion profile, whether to deviate from the vehicle energy consumption profile corresponding to the route being traversed by the vehicle;

in response to a determination to deviate from the vehicle energy consumption profile, selectively control vehicle propulsion of the vehicle according to the intersection propulsion profile; and in response to traversing the intersection:

modify, based on the signal data and the intersection propulsion profile, the vehicle energy consumption profile; and selectively control vehicle propulsion according to the modified vehicle energy consumption profile.

16. The apparatus of claim 15, wherein the signal data includes Signal Phase and Timing (SPaT) data; and the signal data is received via at least one of a vehicle-to-infrastructure communication, vehicle-to-vehicle communication, and a vehicle-to-everything communication.

17. The apparatus of claim 15, wherein the intersection propulsion profile is determined at least in part by multi-horizon optimization; and the signal data is received via at least one of a vehicle-to-infrastructure communication, vehicle-to-vehicle communication, and a vehicle-to-everything communication.

18. The apparatus of claim 15, wherein the signal data indicates at least one of a current state of a traffic signal associated with the signaled intersection and a signal timing of the traffic signal associated with the signaled intersection.

* * * * *